United States Patent
Enescu et al.

(10) Patent No.: US 11,038,647 B2
(45) Date of Patent: Jun. 15, 2021

(54) INTERFERENCE MEASUREMENT RESOURCES FOR A UE IN A WIRELESS COMMUNICATION NETWORK

(71) Applicant: Nokia Technologies Oy, Espoo (FI)

(72) Inventors: Mihai Enescu, Espoo (FI); Deshan Miao, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/333,281

(22) PCT Filed: Sep. 29, 2016

(86) PCT No.: PCT/CN2016/100939
§ 371 (c)(1),
(2) Date: Mar. 14, 2019

(87) PCT Pub. No.: WO2018/058466
PCT Pub. Date: Apr. 5, 2018

(65) Prior Publication Data
US 2019/0229873 A1 Jul. 25, 2019

(51) Int. Cl.
*H04L 1/00* (2006.01)
*H04L 5/00* (2006.01)
*H04W 24/10* (2009.01)

(52) U.S. Cl.
CPC .......... *H04L 5/0051* (2013.01); *H04L 5/0053* (2013.01); *H04W 24/10* (2013.01)

(58) Field of Classification Search
CPC ....... H04L 5/0051; H04L 5/0053; H04L 5/00; H04W 24/10; H04W 72/04
See application file for complete search history.

(56) References Cited

U.S. PATENT DOCUMENTS

| | | | |
|---|---|---|---|
| 2013/0301450 A1* | 11/2013 | Geirhofer | H04B 7/024 370/252 |
| 2015/0110064 A1* | 4/2015 | Hammarwall | H04B 17/382 370/330 |
| 2015/0263796 A1* | 9/2015 | Nam | H04B 7/0452 370/329 |
| 2016/0094374 A1* | 3/2016 | Koorapaty | H04W 72/042 370/329 |

FOREIGN PATENT DOCUMENTS

| | | |
|---|---|---|
| CN | 103037397 A | 4/2013 |
| CN | 103391629 A | 11/2013 |
| CN | 103891337 A | 6/2014 |
| WO | WO 2013/135140 A1 | 9/2013 |
| WO | WO 2013/170114 A1 | 11/2013 |

* cited by examiner

*Primary Examiner* — Abdelnabi O Musa
(74) *Attorney, Agent, or Firm* — Harrington & Smith

(57) ABSTRACT

A flexible way to configure interference measurements is achieved by configuring a terminal device for interference measurement resources with a configuration including at least a first part indicating interference resources that may overlap with one or more reference symbols, and a second part configuration indicating a type of the overlap.

19 Claims, 4 Drawing Sheets

INTERFERENCE MEASUREMENT RESOURCES FOR A UE IN A WIRELESS COMMUNICATION NETWORK

CROSS REFERENCE TO RELATED APPLICATION

This patent application is a U.S. National Stage application of International Patent Application Number PCT/CN2016/100939 filed Sep. 29, 2016, which is hereby incorporated by reference in its entirety.

TECHNICAL FIELD

The invention relates to cellular communication systems and, in particular, to a solution for carrying out interference measurements in such a system.

BACKGROUND

In a cellular communication system link adaptation matches modulation, coding and other signal and protocol parameters to the conditions on a radio link. In LTE/LTE-A (Long term evolution/Long term evolution advanced) systems, the link adaptation is relying on channel quality indicator (CQI) reported from a user equipment and outer loop link adaptation (OLLA) that adapts the reported CQI by an offset: upon receiving an acknowledgement (ACK) one increment is added to CQI, and upon receiving a non-acknowledgement (NACK) one increment is deducted from CQI. Hence, the link adaptation is rather static in nature.

BRIEF DESCRIPTION

The invention is defined by the subject matter of the independent claims. Some embodiments are defined in the dependent claims.

BRIEF DESCRIPTION OF THE DRAWINGS

In the following embodiments will be described in greater detail with reference to the attached drawings, in which.

DETAILED DESCRIPTION OF SOME EMBODIMENTS

Figure 1:
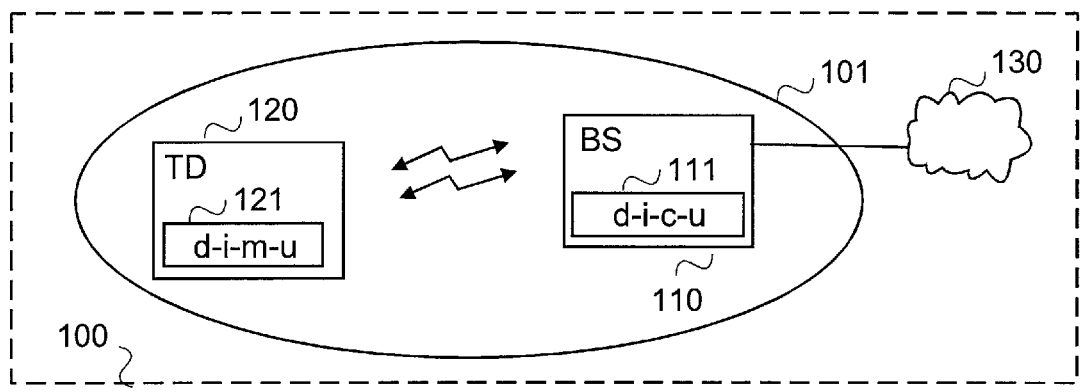
FIG. 1 illustrates an exemplified wireless communication system.

The following embodiments are exemplifying. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

Embodiments and examples described herein may be implemented in any communications system including a wireless system, such as in at least one of the following: Universal Mobile Telecommunication System (UMTS, 3G) based on basic wideband-code division multiple access (W-CDMA), high-speed packet access (HSPA), Long Term Evolution (LTE), LTE-Advanced, LTE-Advanced Pro, fifth generation (5G) system, beyond 5G, and/or wireless local area networks (WLAN) based on IEEE 802.11 specifications on IEEE 802.15 specifications. The embodiments are not, however, restricted to the systems given as an example but a person skilled in the art may apply the solution to other communication systems provided with necessary properties. One example of a suitable communications system is the 5G system, as listed above, and especially 5G new radio (NR) system.

5G has been envisaged to use multiple-input-multiple-output (MIMO) multi-antenna transmission techniques, more base stations or access nodes than the current network deployments of LTE, by using a so-called small cell concept including macro sites operating in co-operation with smaller local area access nodes, such as local ultra-dense deployment of small cells, and perhaps also employing a variety of radio technologies for better coverage and enhanced data rates. 5G will likely be comprised of more than one radio access technology (RAT), each optimized for certain use cases and/or spectrum. 5G system may also incorporate both cellular (3GPP) and non-cellular (e.g. IEEE) technologies. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, including apart from earlier deployed frequencies below 6 GHz, also higher, that is cm Wave and mmWave frequencies, and also being capable of integrating with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as inter-RI operability between cm Wave and mm Wave). One of the concepts considered to be used in 5G networks is network slicing in which multiple independent and dedicated virtual sub-networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are Software-Defined Networking (SDN), Big Data, and all-IP, which may change the way networks are being constructed and managed. For example, one or more of the below described net-work node functionalities may be migrated to any corresponding abstraction or apparatus or device. Therefore, all words and expressions should be interpreted broadly and they are intended to illustrate, not to restrict, the embodiment.

An extremely general architecture of an exemplifying system 100 to which embodiments of the invention may be applied is illustrated in FIG. 1. FIG. 1 is a simplified system architecture only showing some elements and functional entities, all being logical units whose implementation may differ from what is shown. It is apparent to a person skilled in the art that the system may comprise any number of the illustrated elements and functional entities.

Referring to FIG. 1, a cellular communication system 100, formed by one or more cellular radio access networks, such as the Long Term Evolution (LTE), the LTE-Advanced (LTE-A) of the 3rd Generation Partnership Project (3GPP), or the predicted future 5G solutions, is composed of a radio access network of access nodes 110, each controlling a respective cell 101 or cells, thereby providing terminal devices 120 with wireless access to other networks 130 such as the Internet. The cell 101 may be, e.g., a macro cell, a micro cell, femto, or a pico cell, for example. From another point of view, the cell 101 may define a coverage area or a service area of the access node 110.

The access node 110 may be an evolved Node B (eNB) as in the LTE and LTE-A, an access point of an IEEE 802.11-based network (Wi-Fi or wireless local area network, WLAN), or any other apparatus capable of providing one or more cells, controlling radio communication and managing radio resources within the one or more cells. For 5G solutions, the implementation may be similar to LTE-A. In some scenarios, one or more local area access nodes may be arranged within a control area of a macro cell access node. The local area access node may pro-vide wireless access within a sub-cell that may be comprised within a macro cell. Examples of the sub-cell may include a micro, pico and/or femto cell. Typically, the sub-cell provides a hot spot within the macro cell. The operation of the local area access node may be controlled by an access node under whose control area the sub-cell is provided.

In order to take into account varying conditions on a radio link, a procedure called link adaptation is used. For example, a change in traffic load causes changes to a neighbouring cell interference. Another example is a flash-light effect caused by utilization of beamforming, for example to a terminal de-vice in one cell edge may encounter interference from neighbouring cell beam-forming. The varying conditions that may change in a rather speedy way require a flexible, or dynamic, way to configure interference measurement resources. For that purpose the access point comprises a dynamic interference configuring unit (d-i-c-u) 111. Examples of different functionalities of the dynamic interference configuring unit 111 will be described in more detail below. The access node 110 may be called a base station or a network node or a transmission point, and below the term "base station" is used.

The terminal device (TD) 120 refers to a portable computing device (equipment, apparatus), and it may also be referred to as a user device, a user terminal or a mobile terminal or a machine-type-communication (MTC) device, also called Machine-to-Machine device and peer-to-peer device. Such computing devices (apparatuses) include wireless mobile communication devices operating with or without a subscriber identification module (SIM) in hardware or in software, including, but not limited to, the following types of devices: mobile phone, smart-phone, personal digital assistant (PDA), handset, laptop and/or touch screen computer, e-reading device, tablet, game console, notebook, multimedia device, sensor, actuator, video camera, car, refrigerator, other domestic appliances, telemetry appliances, and telemonitoring appliances.

As illustrated in FIG. 1 with the multiple arrows between the base station 110 to the terminal device 120, the downlink and/or the uplink transmission may be carried out by using multi-antenna transmission techniques such as multiple-input-multiple-output (MIMO) communication, either as a multiuser (MU MIMO) or as a single user (SU MIMO). MIMO refers to a scenario where both the access node 110 and the terminal device 120 employ an antenna array comprising a plurality of antenna elements or antenna ports. Naturally it creates further features that should be taken into account in the link adaptation process. The terminal device 120 illustrated in FIG. 1 is configured to support the flexible configuration of interference measurement resources. For that purpose the terminal device 120 comprises a dynamic interference measuring unit (d-i-m-u) 121. Examples of different functionalities of the dynamic interference measuring unit 121 will be described in more detail below.

Figure 2:
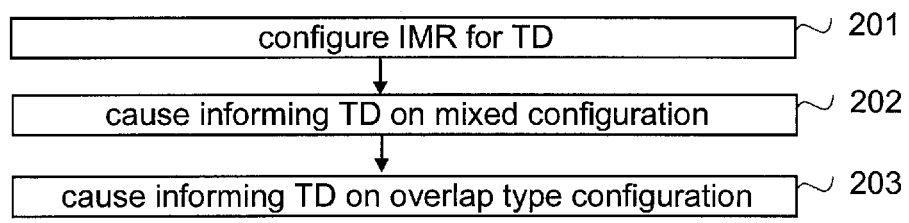
FIGS. 2 and 3 illustrate exemplified processes.

FIG. 2 is a flow chart illustrating an exemplified basic functionality of a base station, or more precisely basic functionality of the dynamic interference configuring unit. In the illustrated example it is assumed that the configuration comprises two parts: a first part that is called herein also a mixed configuration, and covered also by a higher layer configuration, and a second part that indicates, or comprises, a further configuration called herein also a dynamic configuration or an overlap type configuration. Basically one may say that the first part is for controlling different types of structures and the second part is for controlling different types of overlap types and/or needed interference information.

Referring to FIG. 2, interference measurement resource (IMR) or interference measurement resources are configured in block 201 for the terminal device. In other words, a mixed configuration (a higher layer configuration) and overlap type configuration (dynamic configuration) are determined so that different kind of interference measurements can be performed by the terminal device. Different examples of configurations are described in more detail below with FIGS. 4A to 8, without restricting the process to the disclosed examples.

An example for 5G new radio, for example, includes the following higher layer configuration that comprises a channel state information interference measurement configuration. Such configuration may comprise a zero power resource elements structure, such as pattern configuration, subframe information etc. The zero power resource element structure comprises in the higher layer configuration following three options:

1. Zero power resources on which full interference is measured.
2. Zero power resources exactly aligned with precoded dedicated reference symbols (DMRS) resources, on which effective channel of the dominant interfering user can be estimated.
3. Zero power resources with partial mapping/overlap for data resource element or DMRS resource element or both.

The last option, i.e. mapping or overlapping of the zero power resources may be called a mixed structure, and herein also as the mixed configuration. Overlapping of the zero power resources is allowed in several ways. For example, a partial overlapping between the zero power resources and data transmission of interfering terminal devices (i.e. other terminal devices than the one for which the IMR configuration is determined) is allowed. Another example of allowable overlapping of the zero power resources includes partial overlapping between the zero power resources and resources for precoded reference symbols, such as DMRS, in which the transmission of the zero power resources and the precoded reference symbols resources can be from the same base station (transmission point) or from different base stations (transmission points). In the latter case, the interfering precoded reference symbols, such as DMRS of interfering terminal devices may overlap with the zero power resource configured to the terminal device whose configuration is determined.

The overlapping of the zero power resources may further be configured by the dynamic configuration (overlap type configuration) that indicates an overlap type to be used. The amount of different types depends on inter alia on the number of bits used for indicating the overlap type to be used. The overlap type should indicate at least the presence or absence of zero power resources and the presence or absence of non-zero power resources.

Once the configurations are ready, informing the terminal device on IMR on the higher layer configuration is caused in block 202. Since in the example the higher layer configuration is the mixed configuration, informing the terminal device on the overlap type configuration, i.e. on the dynamic configuration, is caused in block 203. The mixed configuration and the overlap type configuration (or an indication of the overlap type configuration) may be transmitted either by signaling them using higher layer signaling, or the mixed configuration may be transmitted using the higher layer signaling and the overlap type configuration (or an indication of the overlap type configuration) by dynamic signaling.

Although not illustrated in FIG. 2, triggering of interference measurement and reporting may be caused by the base station.

Although FIG. 2 describes the process for one terminal device, it should be appreciated that configuring is performed for multiple terminal devices, as will be evident also from examples described below.

Figure 3:
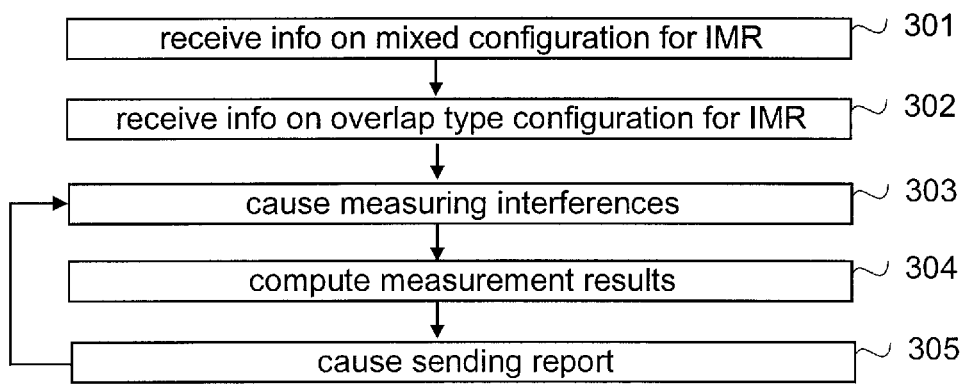

FIG. 3 is a flow chart illustrating an exemplified basic functionality of a terminal device, or more precisely the functionality of the dynamic interference measuring unit. In the example it is assumed that the terminal device is the one whose configuration was determined in FIG. 2.

Referring to FIG. 3, upon receiving information on mixed configuration for IMR (block 301), and information on the overlap type configuration (block 302), interference measuring is caused in block 303. Depending on implementation, it may be that the interference measuring is caused once a trigger for interference measurements is received from a base station.

The terminal device measures the interference according to the received mixed configuration (higher layer configuration) and the overlap type configuration (dynamic configuration). There may also be one or more preset rules for the overlap type configuration in the terminal device, and naturally also in the base station, and the information received indicates which one of the preset rules is to be used for measuring/and or computing As to dynamic configuration, i.e. the overlap type configuration, one bit signaling may be used to convey the information that the terminal device is to compute two types of measurements, and a preset rule is used to define which resource elements are zero power and which resource elements are non-zero power. The definition is based on the higher layer configuration (mixed configuration). An example of such is described below with FIG. 5A. The two types of measurement may results in two separate interference measurement results (two separate CQIs, or a CQI and an interference quality indicator (IQI) or in one main result/report and another report relative to the main result/report (a so called delta CQI).

If two bits are used, they can convey the information and no preset rules are needed. Naturally preset rules may be used in addition. For example, following indications may be used:

00—only zero power resource elements
01—only non-zero power resource elements
10—mixed zero power and non-zero power resource elements with delta reporting
11—mixed zero power and non-zero power resource elements with two separate results Once the measurements have been performed, the indicated reports (results), typically CQI and IQI, or a main CQI and delta CQI, mentioned above, are computed in block 305. As said above, more than two reports (more than two separate CQIs, one CQI and two or more IQIs or the main CQI and more than one delta CQIs) may be computed. Then sending the results (reports) is caused in block 306. In other words, reporting is caused in block 306. Naturally measuring, computing and reporting are repeated at certain intervals. Further, as will be illustrated below, it is possible that the overlap type will be amended.

Instead of computing the results/reports, the different measurements may be sent. For example, a mix of the measurements, such as eigenvalues, covariance matrix or power of the dominant interferer or CQI for the inter-cell interference, may be reported.

Figure 4A:
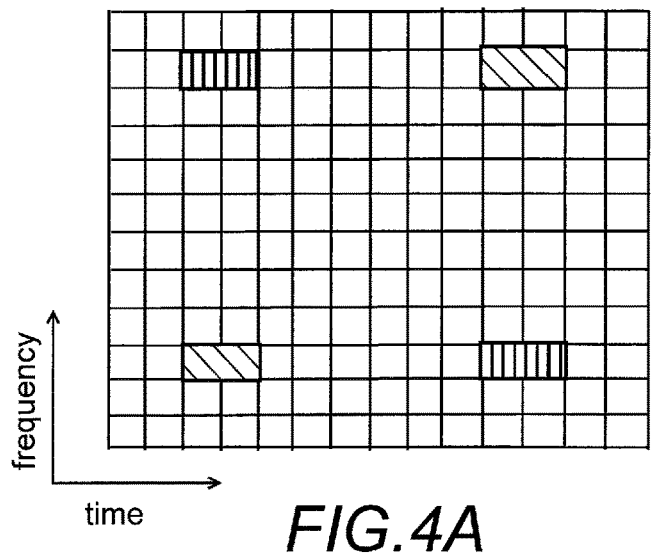
FIGS. 4A to 8 illustrate different examples relating to interference measurement.
Figure 4B:
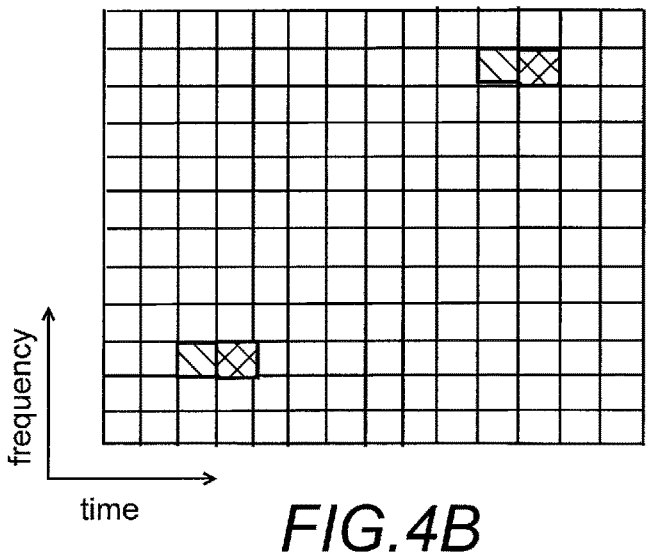
Figure 4C:
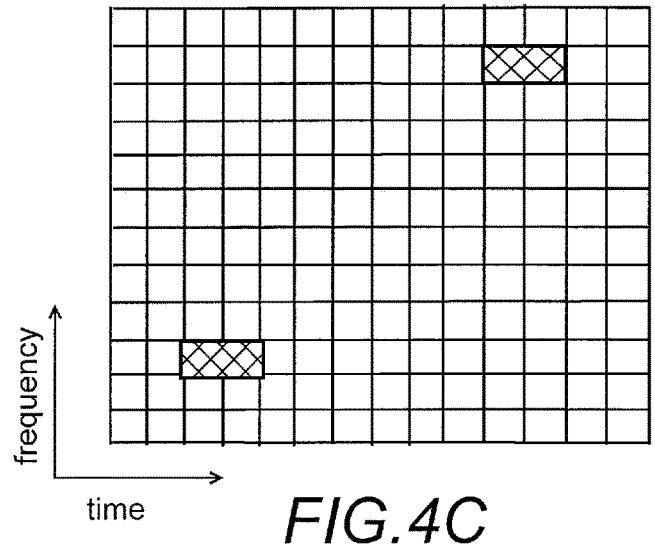

FIGS. 4A to 4C illustrate different configuration examples for interference measurements.

In FIG. 4A one example how to configure zero power resources for interference measurement reports is depicted. Further, the configuration illustrated in FIG. 4A depicts non-zero power resources for channel measurement reports.

In the example illustrated in FIG. 4B the configuration comprises both zero power and non-zero power resources for interference measurement reports. The non-zero resources may be one precoded reference symbol or DMRS. For example, the zero power resources may be used for cumulative interference measurements that may be seen as an inter-cell interference. A cumulative interference measurement is a sum of all the interference impacting data channel of the reporting terminal device. The non-zero power resources within interference measurement resources may be used for targeted interference estimation, such as a paired terminal device in MU MIMO to the reporting terminal device or a dominant interferer being served by a neighbor beam/base station (access point)/cell. The non-zero power resources may be intended/configured for a terminal device that in turn is configured to operate in MU MIMO. By accessing DMRS of an interfering terminal device, the reporting terminal device is able to estimate the effective channel and further measure the power, covariance matrix or other metrics characterizing the transmission of the interfering terminal device. The thus obtained information (a metric) may be used by a so called advanced receiver implementation in the reporting terminal device or the information may be transmitted to the base station.

The non-zero power resources for channel measurements are not depicted in FIG. 4B. However it should be appreciated that the non-zero power resources may be configured in the same manner that is depicted in FIG. 4A, or differently.

In the example illustrated in FIG. 4C, only non-zero power resources are configured. In other words, in the example an interference measurement resource element, i.e. a non-zero power resource element of one terminal device is matched with a non-zero power resource element of another terminal device, or with another non-zero power resource element in the cell. The illustrated configuration may be used when there is a need to redefine CQI, for example in MU MIMO operation mode.

As with FIG. 4B, the non-zero power resources for channel measurements are not depicted in FIG. 4C. However it should be appreciated that the non-zero power resources may be configured in the same manner that is depicted in FIG. 4A, or differently.

Figure 5A:
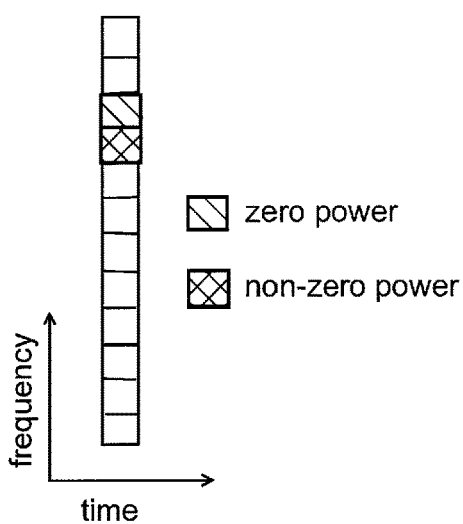
Figure 5B:
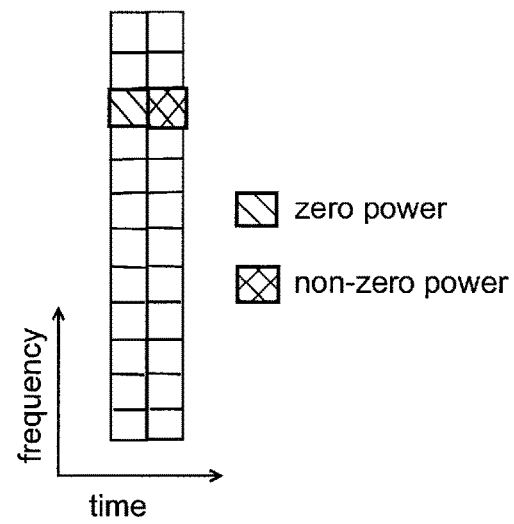

FIGS. 5A and 5B depict examples of multiplexing of configured interference measurement resources. FIG. 5A depicts multiplexing for 1-symbol slot and FIG. 5B for 2-symbol slot.

Referring to indicating the interference type configuration by one bit, and using the example in FIG. 5A, the particular pattern is indicated by the mixed configuration (first part) to the terminal device. Therefore the terminal device is can implicitly conclude that on one resource element there is zero power resource element and on the other resource element there is non-zero power resource element. Preset rules could be that without any dynamic configuration the terminal device will report both, and with dynamic configuration the value of the bit indicates which one of the interference types reporting will be triggered. Another example, using the example in FIG. 5A includes following preset rules: if the mixed configuration (higher layer configuration) indicates two recourse elements that both are zero power resource elements, an instruction that two types of interference is to be reported is indicated by the terminal device upon receiving an indication that DMRS is configured in one of the two resource elements.

Figure 6A:
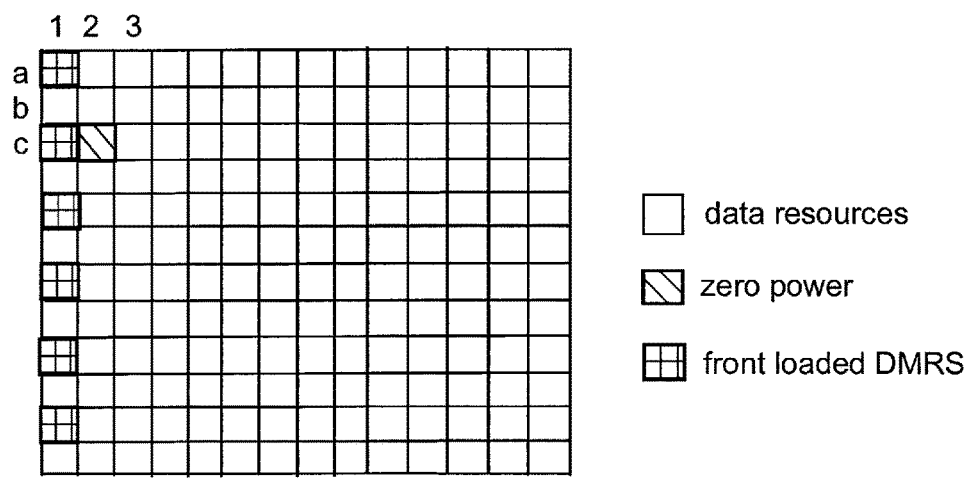
Figure 6B:
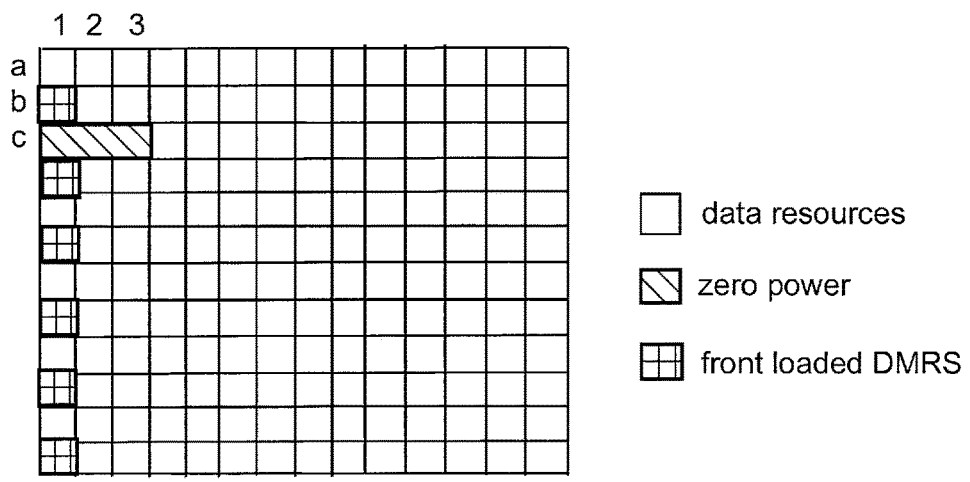

FIGS. 6A and 6B illustrate examples of interference measurement resources for two terminal devices A and B, FIG. 6A depicting interference measurement resources in the new radio physical downlink shared channel (NR_PDSCH) for the terminal device A, and FIG. 6B depicting interference measurement resources in the new radio physical down-link shared channel (NR_PDSCH) for the terminal device B.

In the illustrated example of FIG. 6A the terminal device A is configured (positions c1, c2, c3) with DMRS on resource element c1, zero-power interference measurement resource on resource element c2, and data on resource element c3.

In the illustrated example of FIG. 6B the terminal device B is configured (positions c1, c2, c3) with three zero-power interference measurement resources on resource elements c1, c2, and c3.

With the above described configurations the terminal device B, or more precisely its dynamic interference measuring unit, may perform following measurements:
   on resource element c1 an effective channel of the terminal device A is estimated based on DMRS of the terminal device A
   on resource element c2 inter-cell interference is estimated, excluding interference caused by the terminal device A
   on resource element c3 interference caused by the data channel of the terminal device A and a new radio physical downlink shared channel interference is estimated from the terminal device A.

Figure 7:
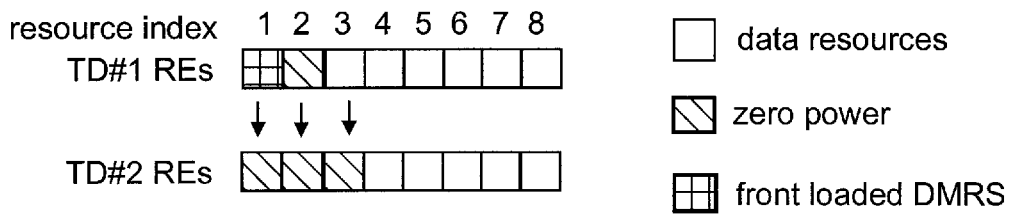

FIG. 7 illustrates an example on types of interference that may be estimated by the terminal device B with configurations of FIGS. 6A and 6B, described above.

The example may be generalized by use of preset rules for the types. For example, a rule may be that if the interference measurement resource configuration is "three zero-power interference measurement resources for IMR", the preset rule defines to measure following types in the following order: on the first resource element a dominant interferer is measured, on the second resource element inter-cell interference excluding the dominant interferer is measured, and on the third resource element interference from a data of the dominant interferer is measured.

Figure 8:
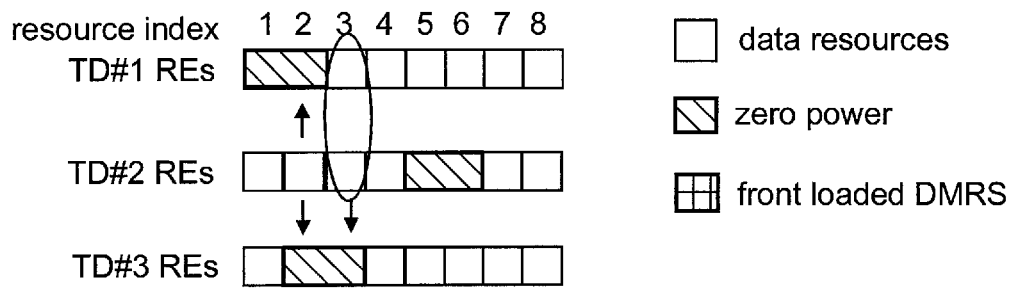

FIG. 8 illustrates an example of partially overlapping interference measurement resources with three terminal devices, TD #1, TD #2 and TD #3. In the illustrated example, on resource #2 the terminal device TD #3 can estimate only the terminal device TD #2, which may be a dominant interferer, whereas on resource #3 the terminal device TD #3 can estimate a cumulative interference caused by the terminal devices TD #1 and TD #2.

Figure 9:
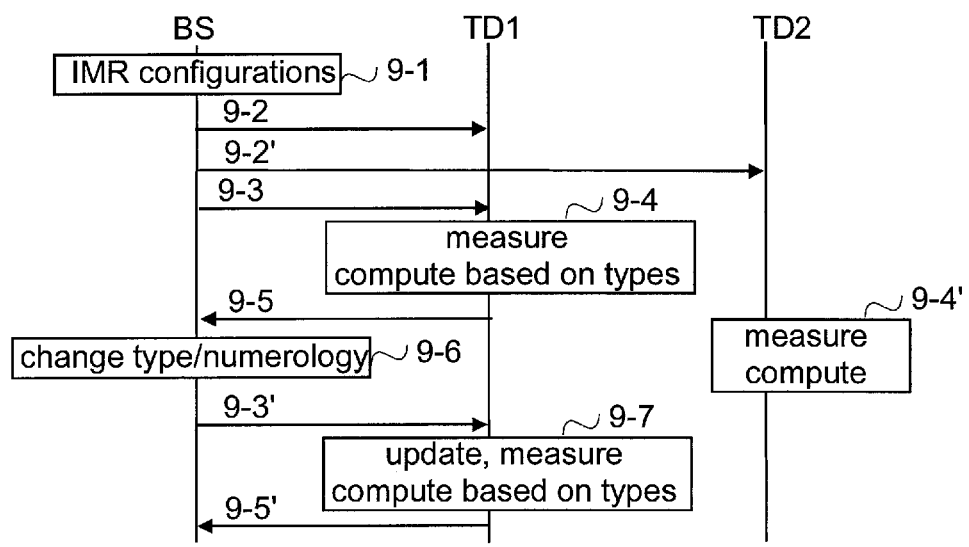
FIG. 9 illustrates an exemplified information exchange.

FIG. 9 illustrates an exemplified information exchange. In the illustrated example it is assumed TD1 is configured with the two level configuration, i.e. a configuration comprising the first part (mixed) and the second part (dynamic) and TD2 with one level configuration, i.e. no dynamic configuration is configured for TD2.

Referring to FIG. 9, a base station configures in block 9-1 interference measurement resources to terminal devices TD1 and TD2, as described above. In other words, IMR configurations for the terminal devices are determined. Then they are signaled to the terminal devices: the higher layer configuration for TD1 is signaled in message 9-2 and the higher layer configuration for TD2 in message 9-2'. For example, channel state information interference measurement (CSI-IM) is configured and consist of resource elements on which interference is calculated, the difference between the configurations being that for TD1 the channel state information interference measurement resources may overlap with dedicated reference symbols (the mixed structure) whereas in the configuration for TD2 the channel state information interference measurement resources may not overlap with dedicated reference symbols (a non-mixed structure). Messages 9-2 and 9-2' may be part of radio resource control (RRC) signaling, for example, that may be mapped in the physical downlink shared channel.

Further, since TD1 is configured also with the dynamic configuration (i.e. the overlap type configuration), it is signaled to TD1 in message 9-3. Message 9-3 may be part of dynamic signaling, such as downlink control information that may be mapped in the physical downlink control channel, or the message 9-3 may be part of message 9-2.

Upon receiving the configurations the terminal devices start the interference reporting. TD1 performs in block 9-4 measurements according to the received mixed and dynamic configurations, as described above with other examples, and computes two results based on types. The results are signaled in message 9-5 to the base station BS. It should be appreciated that if more terminal devices are involved, the amount of computed results may be bigger, as is evident from the example of FIG. 8.

TD2 acts in a similar way as prior art terminal devices, i.e. performs in block 9-4' a measurement according to the received one level configuration, computes one result and signals the result to the base station (the reporting is not illustrated in FIG. 9).

Then, for some reason, the base station reconfigures in block 9-6' the dynamic part (overlap type) of the interference measurement resource configuration of TD1, and signals the new dynamic configuration to TD1 in message 9-3'. (Message 9-3' may be part of dynamic signaling.) A reason for reconfiguring the dynamic configuration (the second part) may be to find out dominant interference ratio (DIR) of TD1, or not to any more find it out.

Another reason for reconfiguring, i.e. configuring with a new second part may relate to use of multiple numerologies. For example, the terminal device may have a different numerology than the base station, and the numerology may change. The change, and naturally the original numerology may be indicated in the dynamic configuration. There may be preset rules and/or patterns for the numerology type of interference measurement. Examples of such interference measurement methods that may change upon change of numerology include following:
1. Use of blind detection for power energy. According to power energy detection, rough interference strength can be monitored.
2. Base station (radio access network) indicating the numerology of neighboring cells. The terminal device then performs Fast Fourier Transform (FFT) scale to measure (catch up) neighboring cell interference.

A terminal device supporting mixed numerology may be configured to scale the numerology of IMR such that data and DMRS of the interference cell are properly captured inside the configured IMR to guarantee the quality of the interference estimation. Upon receiving the update to the dynamic part, i.e. message 9-3', TD1 updates in block 9-7 the configuration correspondingly, and then performs in block 9-7 measurements according to the updated two level configurations, and computes at least two results based on updated configuration. The results are signaled in message 9-5' to the base station BS.

As is evident from the above, the higher layer configuration is a semistatic configuration, which may be changed with radio resource control signaling, or other corresponding signaling having low periodicity (rather long time intervals between consecutive transmissions) whereas the overlap type configuration (dynamic configuration) may be changed more frequently by transmitting information on it on downlink control information, or corresponding information sent to a terminal device essentially all the time the terminal device needs to decode data or needs to prepare an uplink transmission, i.e. when the interference actually causes problems.

Thanks to the dynamic configuration enabling a flexible way to configure interference measurement resources with various options for interference estimation, it is possible to track interference variation fast.

The blocks, related functions, examples and information exchanges described above by means of FIGS. 2 to 9 are in no absolute chronological order, and some of them may be performed simultaneously or in an order differing from the given one. Other functions can also be executed between them or within them, and other information may be sent. Some of the blocks or part of the blocks or one or more pieces of information can also be left out or replaced by a corresponding block or part of the block or one or more pieces of information. For example, the terminal device may be provided additional information, such as indication what type of interference to measure and report by tagging (including) such additional information into signaling (dynamic or higher layer). An example of additional information is a measurement restriction indicating whether or not averaging in time for the interference is allowed or not.

The techniques and methods described herein may be implemented by various means so that an apparatus, i.e. a base station (access node)/terminal device, configured to support flexible interference measurement configuration based on at least partly on what is disclosed above with any of FIGS. 1 to 9, including implementing one or more functions/operations of a corresponding base station or terminal device described above with an embodiment/example, for example by means of any of FIGS. 2 to 9, comprises not only prior art means, but also means for implementing the one or more functions/operations of a corresponding functionality described with an embodiment, for example by means of any of FIGS. 2 to 9, and it may comprise separate means for each separate function/operation, or means may be configured to perform two or more functions/operations. For example, one or more of the means and/or the dynamic interference configuring unit and/or the dynamic interference measuring unit described above may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, logic gates, other electronic units designed to perform the functions described herein by means of FIGS. 1 to 9, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 10:
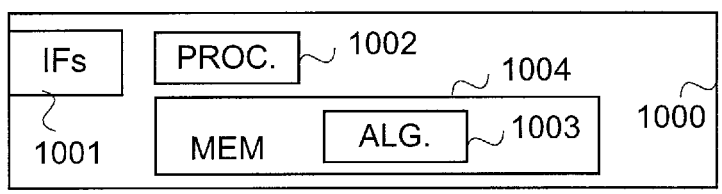
FIGS. 10 and 11 are schematic block diagrams.
Figure 11:
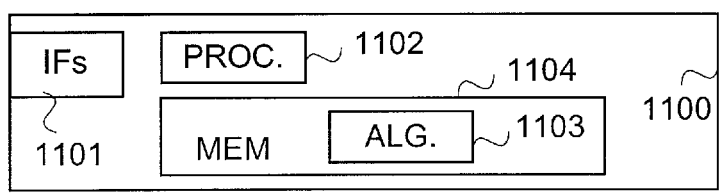

FIGS. 10 and 1 provide apparatuses according to some embodiments of the invention. FIG. 10 illustrates an apparatus configured to carry out the functions described above in connection with a base station. FIG. 11 illustrates an apparatus configured to carry out the functions described above in connection with the terminal device. Each apparatus may comprise one or more communication control circuitry, such as at least one processor 1002, 1102, and at least one memory 1004, 1104 including one or more algorithms 1003, 1103, such as a computer program code (software) wherein the at least one memory and the computer program code (software) are configured, with the at least one processor, to cause the apparatus to carry out any one of the exemplified functionalities of each respective apparatus.

The memory 1004, 1104 may be implemented using any suitable data storage technology, such as semiconductor based memory devices, flash memory, magnetic memory devices and systems, optical memory devices and systems, fixed memory and removable memory. The memory may store one or more preset rules described above.

The apparatus may further comprise different interfaces 1001, 1101 such as one or more communication interfaces (TX/RX) comprising hardware and/or software for realizing communication connectivity according to one or more communication protocols. The communication interface may provide the apparatus with communication capabilities to communicate in the cellular communication system and enable communication between different network nodes and between the terminal device and the different network nodes, for example. The communication interface may comprise standard well-known components such as an amplifier, filter, frequency-converter, (de)modulator, and encoder/decoder circuitries and one or more antennas. The communication interfaces may comprise radio interface components providing the base station and the terminal device with radio communication capability in the cell. Further, the apparatus 1100 may comprise one or more user interfaces, such as a screen, microphone and one or more loudspeakers for interaction with the user.

Referring to FIG. 10, at least one of the communication control circuitries in the apparatus 1000 is configured to provide the dynamic interference configuring unit, or any corresponding sub-unit, and to carry out functionalities described above by means of any of FIGS. 2 and 4A to 9 by one or more circuitries.

Referring to FIG. 11, at least one of the communication control circuitries in the apparatus 1100 is configured to provide the dynamic interference measuring unit, or any corresponding sub-unit, and to carry out functionalities described above by means of any of FIGS. 3 to 9 by one or more circuitries.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a base station, or another network device.

In an embodiment, the at least one processor, the memory, and the computer program code form processing means or comprises one or more computer program code portions for carrying out one or more operations according to any one of the examples of FIGS. 2 to 9 or operations thereof.

Embodiments as described may also be carried out in the form of a computer process defined by a computer program or portions thereof. Embodiments of the methods described in connection with FIGS. 2 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a per-son of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A method comprising:
configuring interference measurement resources for a terminal device with a configuration comprising at least a first part indicating interference measurement resources that may overlap with one or more reference symbols and a second part indicating a type of the overlap;
wherein either: the second part of the configuration conveys that a preset rule defines which of the reference symbols are zero power and which of the reference symbols are non-zero power based on the first part of the configuration; or the second part of the configuration defines which of the reference symbols are zero power and which of the reference symbols are non-zero power; and
causing sending to the terminal device the first part and the second part.

2. A method as claimed in claim 1, further comprising:
causing sending the first part in higher layer signaling and the second part in dynamic signaling, the dynamic signaling being sent in response to the terminal device experiencing interference, wherein the second part of the configuration is sent more frequently than the first part of the configuration.

3. A method as claimed in claim 1, further comprising:
configuring a new second part for the configuration; and
causing sending the new second part to the terminal device in dynamic signaling.

4. A method as claimed in claim 3, wherein the new second part indicates a numerology configuration for the interference.

5. The method of claim 1,
wherein at least one bit is used to signal the second part of the configuration indicating the type of the overlap;
wherein when the second part of the configuration comprises multibit signaling, the second part of the configuration defines which of the reference symbols are zero power and which of the reference symbols are non-zero power;
wherein when the second part of the configuration does not comprise multibit signaling, the second part of the configuration conveys that a preset rule defines which of the reference symbols are zero power and which of the reference symbols are non-zero power, based on the first part of the configuration.

6. The method of claim 1, wherein the one or more reference symbols are demodulation reference signals, and the second part of the configuration indicates the type of the overlap between the interference measurement resources and the demodulation reference signals.

7. A method comprising:
receiving at a terminal device a first part of a configuration for interference measurement resources, the first part indicating interference measurement resources that may overlap with one or more reference symbols, and a second part of the configuration, the second part indicating a type of the overlap;
wherein either: the second part of the configuration conveys that a preset rule defines which of the reference symbols are zero power and which of the reference symbols are non-zero power based on the first part of the configuration; or the second part of the configuration defines which of the reference symbols are zero power and which of the reference symbols are non-zero power;
performing measurements according to the received configuration;
computing a first measurement result and at least one second measurement result according to the received configuration; and
causing sending an interference measurement report comprising the first measurement result and the at least one second measurement result.

8. A method as claimed in claim 7, further comprising receiving the first part in higher layer signaling; and
receiving the second part in dynamic signaling, the dynamic signaling being received in response to the terminal device experiencing interference, wherein the second part of the configuration is received more frequently than the first part of the configuration.

9. A method as claimed in claim 7, wherein the first measurement result is a channel quality indicator and the at least one second measurement result is an interference quality indicator.

10. A method as claimed in claim 7, wherein the first measurement result is a channel quality indicator and the at least one second measurement result is a delta to the channel quality indicator.

11. A method as claimed in claim 7, further comprising:
receiving at the terminal device in dynamic signaling a new second part for the configuration;
updating the configuration correspondingly; and
using the updated configuration.

12. A method as claimed in claim 7, wherein the overlap type is one of the following types allowing overlap of only zero power resource elements, overlap of only non-zero power resource elements, and an overlap of mixed zero power and non-zero power resource elements.

13. An access node comprising:
at least one processor, and
at least one non-transitory memory comprising a computer program code, wherein the processor, the memory, and the computer program code are configured to cause the access node to:
configure interference measurement resources for use with a terminal device with a configuration comprising at least a first part indicating interference measurement resources that may overlap with one or more reference symbols and a second part indicating a type of the overlap;
wherein either: the second part of the configuration conveys that a preset rule defines which of the reference symbols are zero power and which of the reference symbols are non-zero power based on the first part of the configuration; or the second part of the configuration defines which of the reference symbols are zero power and which of the reference symbols are non-zero power; and
send to the terminal device the first part and the second part.

14. An access node as claimed in claim 13, wherein the processor, the memory, and the computer program code are further configured to cause the access node to send the first part in higher layer signaling and the second part in dynamic signaling, the dynamic signaling being sent in response to the terminal device experiencing interference, wherein the second part of the configuration is sent more frequently than the first part of the configuration.

15. An access node as claimed in claim 13, wherein the processor, the memory, and the computer program code are further configured to cause the access node to configure a new second part for the configuration and send the new second part to the terminal device in dynamic signaling.

16. A terminal device comprising:
at least one processor, and
at least one non-transitory memory comprising a computer program code, wherein the processor, the memory, and the computer program code are configured to cause the terminal device to:
perform measurements according to a received configuration for interference measurement resources, the configuration comprising a first part indicating interference measurement resources that may overlap with one or more reference symbols, and a second part indicating a type of the overlap;
wherein either: the second part of the configuration conveys that a preset rule defines which of the reference symbols are zero power and which of the reference symbols are non-zero power based on the first part of the configuration; or the second part of the configuration defines which of the reference symbols are zero power and which of the reference symbols are non-zero power;
compute a first measurement result and at least one second measurement result according to the received configuration; and
cause sending an interference measurement report comprising the first measurement result and the at least one second measurement result.

17. A terminal device as claimed in claim 16, wherein the processor, the memory, and the computer program code are further configured to cause the terminal device to receive the first part of the configuration in higher layer signaling, and the second part in dynamic signaling, the dynamic signaling being received in response to the terminal device experiencing interference, wherein the second part of the configuration is received more frequently than the first part of the configuration.

18. A non-transitory computer readable media having stored thereon instructions that, when executed by a computing device, cause the computing device to:
configure interference measurement resources for a terminal device with a configuration comprising at least a first part indicating interference measurement resources that may overlap with one or more reference symbols and a second part indicating a type of the overlap;

wherein either: the second part of the configuration conveys that a preset rule defines which of the reference symbols are zero power and which of the reference symbols are non-zero power based on the first part of the configuration; or the second part of the configuration defines which of the reference symbols are zero power and which of the reference symbols are non-zero power, and send to the terminal device the first part and the second part.

19. A non-transitory computer readable media having stored thereon instructions that, when executed by a computing device, cause the computing device to:

perform measurements according to a received configuration for interference measurement resources, the configuration comprising a first part indicating interference measurement resources that may overlap with one or more reference symbols, and a second part of the configuration, the second part indicating a type of the overlap;

wherein either: the second part of the configuration conveys that a preset rule defines which of the reference symbols are zero power and which of the reference symbols are non-zero power based on the first part of the configuration; or the second part of the configuration defines which of the reference symbols are zero power and which of the reference symbols are non-zero power;

compute a first measurement result and at least one second measurement result according to the received configuration; and cause sending an interference measurement report comprising the first measurement result and the at least one second measurement result.

* * * * *